United States Patent [19]
Pentti et al.

[11] Patent Number: 5,641,721
[45] Date of Patent: Jun. 24, 1997

[54] PREPOLYMERIZED CATALYST COMPOSITION, A PROCESS FOR THE PREPARATION THEREOF, AND A PROCESS FOR POLYMERIZING α-OLEFINS

[75] Inventors: Ismo Pentti, Kulloo; Pauli Leskinen, Helsinki, both of Finland

[73] Assignee: Neste Oy, Espoo, Finland

[21] Appl. No.: 571,029

[22] Filed: Dec. 12, 1995

Related U.S. Application Data

[63] Continuation of Ser. No. 174,787, Dec. 29, 1993, abandoned.

[30] Foreign Application Priority Data

Dec. 29, 1992 [FI] Finland ................... 925913

[51] Int. Cl.$^6$ ................... C08F 4/654
[52] U.S. Cl. ................... 502/103; 502/104; 502/109; 502/117; 502/118; 502/125; 502/159; 526/125.3; 526/903; 526/904
[58] Field of Search ................... 502/104, 109, 502/151, 159, 103, 117, 118, 125; 526/125.3, 903, 904

[56] References Cited

U.S. PATENT DOCUMENTS

| | | | |
|---|---|---|---|
| 3,061,601 | 10/1962 | Watt. | |
| 3,817,970 | 6/1974 | Mueller-Tamm | 526/904 |
| 3,849,334 | 11/1974 | Frielingsdorf et al.. | |
| 4,200,715 | 4/1980 | Lynch et al.. | |
| 4,235,747 | 11/1980 | Leung | 526/139 |
| 4,579,836 | 4/1986 | Arzoumanidis et al. | 502/133 |

FOREIGN PATENT DOCUMENTS

| | | |
|---|---|---|
| 1238749 | 6/1988 | Canada. |
| 0083074 | 7/1983 | European Pat. Off.. |
| 0260647 | 3/1988 | European Pat. Off.. |
| 61371 | 7/1970 | Luxembourg. |
| 1309467 | 3/1973 | United Kingdom. |
| 2189252 | 10/1987 | United Kingdom. |

OTHER PUBLICATIONS

Boor, Jr., John, *Ziegler–Natta Catalysts and Polymerizations*, Academic Press, New York, 1979, pp. 602–609.

*Primary Examiner*—Romulo H. Delmendo
*Attorney, Agent, or Firm*—Birch, Stewart, Kolasch & Birch, LLP

[57] ABSTRACT

The present invention concerns prepolymerized catalyst composition for polymerization of α-olefins, a process for the preparation thereof and a process for polymerization of α-olefins. According to the polymerization process a procatalyst composition containing a transition metal is prepolymerized with a monomer in order to produce a prepolymerized Ziegler-Natta type catalyst composition and said catalyst composition is contacted with an alpha-olefin monomer, in particular with ethylene or propylene, for preparing a polymer. According to the invention the procatalyst composition is preferably prepolymerized in a medium which is inert to the catalyst components, the viscosity of the medium being so high that the catalyst does not substantially settle in this medium. Because the catalyst composition according to the invention does not have to be dried before being fed into the medium, its activity is high before and during polymerization.

21 Claims, No Drawings

PREPOLYMERIZED CATALYST COMPOSITION, A PROCESS FOR THE PREPARATION THEREOF, AND A PROCESS FOR POLYMERIZING α-OLEFINS

This application is a continuation of application Ser. No. 08/174,787 filed on Dec. 29, 1993, now abandoned.

BACKGROUND OF THE INVENTION

1. Field of the Invention

The present invention concerns a prepolymerized catalyst composition suitable for use in the polymerization of alpha-olefins and a process for preparing such a composition. The invention also relates to a process for polymerizing α-olefins with a Ziegler-Natta catalyst composition, according to which a procatalyst composition comprising a transition metal is prepolymerized with a monomer for producing a Ziegler-Natta type prepolymerized catalyst composition and this catalyst composition is contacted with an alpha-olefin monomer in order to produce a polymer.

2. Description of the Related Art

Ziegler-Natta catalysts have been used for a long time for stereospecific polymerization of alpha-olefins. In their broadest sense Ziegler-Natta catalysts comprise a compound, usually a halide, of a transition metal of groups IV to VIII of the periodic system together with a cocatalyst comprising an alkyl derivative of a group I to III metal. Titanium chlorides are representatives of typical transition metal compounds used, and of the metal alkyl compounds aluminium alkyl derivatives should be mentioned. Often a Ziegler-Natta catalyst also contains an electron donor, such as a Lewis base, the purpose of which is to render the polymerization product more isotactic. In order to improve the catalyst's activity, its surface is increased by adding the catalyst onto a support. The most common support is magnesium dichloride.

The activity of supported catalysts (calculated on basis of the weight of the transition metal) can be up to 100 times higher than the activity of unsupported catalysts. This is the reason why a growing interest is being focused on these catalysts. Supported Ziegler-Natta type catalysts can be prepared by depositing a transition metal compound, such as titanium tetrachloride, on a support, and then reducing the transition metal compound with an organic metal compound acting as a cocatalyst either before polymerization or at the beginning of polymerization. The deposited support is often dried before being subjected to reduction, but polymerization and reduction of the transition metal can be carried out directly after deposition of the catalyst on the support, which makes it possible to omit the drying step. This alternative is preferred if the supported catalyst is to be posttreated by prepolymerizing a suitable monomer on its surface, which is the case in, for instance, bulk polymerization of propene, wherein the catalyst is prepolymerized before being added into the polymerization reactor.

According to conventional technology, the Ziegler-Natta catalyst is used for polymerization in particulate form. In order to facilitate catalyst dosing the catalyst can be combined with wax which makes it possible to continuously to feed a prepolymerized wax catalyst into the polymerization reactor. By way of example, reference is made to GB Patent Application No. 2,189,252, which discloses a catalyst for the polymerization of 1-alkenes. Said prior art catalyst is prepared by depositing transition metal compounds on silica or alumina, a paraffinic hydrocarbon being applied to the catalyst together with a transition metal compound or to the completed catalyst. The paraffinic hydrocarbon can be prepared by prepolymerization of a small amount of 1-alkenes on the support.

The handling of wax catalysts is uncomplicated and safe during the various stages of the process. An additional benefit associated with wax protected catalysts resides in the fact that the catalyst is not as easily destroyed by external catalyst poisons as conventional catalysts. However, as a disadvantage, it should be noted that the process for preparing the wax catalysts comprises several stages; according to the prior art, the catalyst particles will first have to be dried before they can be mixed with the wax, in which they are prepolymerized. The GB Patent Application No. 2,189,252 mentioned above indicates that the solvent used during the addition of the wax has to be removed, e.g., by decanting, by evacuation or by evaporation.

The preparation reactions and the reactants of the Ziegler-Natta-catalysts are extremely sensitive to impurities. In particular, the drying of the catalyst is a sensitive stage during which the catalyst may easily be deactivated. For this reason there have been developed processes which comprise conducting the activation, washing, drying and prepolymerization stages in the same apparatus. In this context, reference is made to the equipment described in the U.S. Patent Specifications Nos. 5,137,551 and 5,215,949. Said references do not, however, deal with the preparation of prepolymerized catalysts which are fed in wax.

SUMMARY OF THE INVENTION

It is an aim of the present invention to eliminate the disadvantages of the prior art while providing an entirely novel prepolymerized Ziegler-Natta catalyst composition and a process for the preparation thereof. The invention also aims at providing a novel process for polymerization of α-olefins with the help of Ziegler-Natta catalysts mixed with wax.

The invention is based on the concept of combining the preparation of the prepolymerized wax catalyst with the activation of the catalyst. The last drying stage of the catalyst activation is then entirely left out and the prepolymerization of the wax catalyst is carried out after activation in a viscous medium.

According to the invention the medium used for prepolymerization comprises a substance which is inert to the catalyst components and which has a viscosity suitably high for preventing the catalyst from settling in this medium during transport or storage. Within the scope of the present invention, this substance is called "a viscous substance". Typically, the viscosity of such a medium is in the range of about 1,000 to 15,000 cP, preferably 4,000 to 10,000 cP.

More specifically, the catalyst composition according to the invention is characterized in that it comprises a transition metal prepolymerized with a prepolymerization monomer in the presence of a viscous substance.

The process according to the invention for preparing said composition comprises the steps of (a) forming a procatalyst composition by depositing a transition metal compound on a suitable support, (b) adding said procatalyst composition to a viscous substance; and (c) prepolymerizing said procatalyst composition with said prepolymerization monomer in the presence of said viscous substance to obtain said prepolymerized catalyst composition.

DETAILED DESCRIPTION OF THE INVENTION

Within the scope of the present application, the term "procatalyst" denotes a transition metal compound suitable for a Ziegler-Natta catalyst, containing the metal in reduced or reducible form. The term "procatalyst composition" means, again, a composition which, in addition to a transition metal, also can contain other substances, such as supports and (internal) electron donors and other similar additional components.

The transition metal compound of the procatalyst composition can comprise compounds of different kinds. The most usual are titanium compounds—organic or inorganic—having an oxidation degree of 3 or 4. Of the other transition metals, vanadinium, zirconium, chromium, molybdenum, cobalt, nickel, tungsten and many rare earth metals should be mentioned. The transition metal compound is usually a halide or oxyhalide, an organic metal halide or purely a metal organic compound. In the last-mentioned compounds, there are only organic ligands attached to the transition metal. Particularly preferred transition metal compounds are selected from the group comprising halides of titanium, in particular $TiCl_4$, and titanium alkoxides and alkoxy halides. The following examples of other suitable compounds can be mentioned: vanadinium trichloride, triacetyl acetone vanadinium and triacetyl acetone chromium, cobalt chloride-pyridinium complexes, dichorodicyclopentadienyl titanium.

According to the invention, a supported catalyst composition is prepared, wherein the support mainly is inert, i.e., it does not affect the polymerization reaction in itself. However, when the catalyst particles are deposited on the surface of a support having a large surface, the monomer molecules are more readily polymerized. The support is either an organic compound (e.g. a polymer) or an inorganic compound, such as a metal oxide. The following inorganic componds may be mentioned: silicon dioxide, aluminum oxide. Ti, Mg, Cr, Ba, Th and Zr oxides, silicates, halides, such as $CaCl_2$, and in particular magnesium halides, the most important of which is $MgCl_2$. The inorganic support can also be a metal hydroxide or a metal hydroxy halide. Combinations of various supports are possible, as well. Typical support combinations are silica and magnesium dichloride and cogels of silica and other oxides.

During "prepolymerization" the procatalyst composition is contacted with a monomer in the presence of a cocatalyst and possibly an (external) electron donor, the monomer being polymerized on the surface of the composition.

The cocatalysts conventionally used are comprised of aluminum compounds, but compounds of lithium, sodium and potassium, alkaline earth metals as well as compounds of other earth metals than aluminum are possible. The compounds are usually hydrides, organometal or halide compounds. Conventionally, the cocatalysts are selected from the group comprising Al-trialkyls, Al-alkyl halides, Al-alkoxides, Al-alkoxy halides and Al-halides. In particular, Al-chlorides are used. These compounds are exemplified by triethyl aluminum, ethyl aluminum chloride, ethyl aluminum dichlorides and aluminum trichloride. Butyl lithium and butyl magnesium iodide are examples of useful compounds of other metals.

As mentioned above, Lewis base type donors known per se can be used for improving the stereospecificity of the catalyst. The donors are divided into two categories depending on whether they are added to the mixture of the transition metal compound and the support (internal donors) or to the mixture of the monomer and the catalyst component (external donors). Donors of both kinds can, of course, be added to the catalyst system, for instance by first preparing a procatalyst composition by way of depositing the transition element on the support in the presence of an internal donor, and then reacting the procatalyst composition with the monomer, a cocatalyst and an external donor being added to the polymerization mixture. The internal and external donors can be identical or different, the main donor types being represented by ethers, esters, carboxylic compounds, ketones, amines, amides, phosphines, organophosphorous compounds and polymer derivatives. In the examples below, ether compounds have been used as external donors.

According to the invention the procatalyst composition is prepolymerized with a suitable monomer in the presence of a polyolefinic wax in order to produce a prepolymerized catalyst composition. Within the scope of the present invention, the term "catalyst composition" denotes a composition which, in addition to the components of the procatalyst composition, contains a cocatalyst and possibly an external donor and which can be used for polymerization of olefins.

Any suitable monomer with unsaturated bonds can be used for prepolymerization. Particularly suitable monomers are 1-olefins, such as ethylene, propene, butene, 4-methylpentene and vinylcycloalkanes, in particular vinyl cyclohexane. Mixtures of monomers can be employed in prepolymerization, and prepolymerization monomers can be combined also by changing the monomer in the middle of the prepolymerization.

Often, a chain transfer agent suitable for regulating the molecular weight and the molecular weight distribution of the polymer product produced can be used for prepolymerization. As chain transfer agents, different metal organic compounds, such as alkyl Zn compounds, or hydrogen, can be employed. Hydrogen is a typical and preferred alternative, because it does not leave any foreign atoms in the polymer.

It should be pointed out that the same or different monomer can be applied for prepolymerization as for the production of the actual polyolefin product.

According to the invention different oils and waxes having a sufficiently high viscosity can be used as viscous substances. As mentioned above the viscosity of the selected medium should be at least 1,000 cP. The medium should furthermore be inert with respect to the components of the catalyst which is being prepared and it must be suitable for dosing of the catalyst. Thus, there should be no additives, such as stabilizers, present in the medium which could act as catalyst poisons, nor should there be polar groups, which may interfere with polymerization. Of the suitable high-viscosity oils, different synthetic poly-alpha-olefin oils should be mentioned in particular. The molecular weight of said oils are typically in the range of about 400 to about 1,000, and their viscosity numbers exceed 70.

According to a preferred embodiment of the invention the medium used for feeding the catalyst comprises a viscous substance which preferably is comprised of a polyolefin-based mixture, in particular a polyolefin, preferably polyethylene or atactic polypropene, dissolved in a poly-α-olefin oil (PAO) or mixed therewith. Typically, the polyolefin concentration of a mixture of this kind amounts to 1 to 50%, preferably 1 to 25% of the weight of the PAO. Also other viscous compounds can be used, provided they meet the above requirements regarding the functional groups and additives.

According to a preferred embodiment of the invention, the prepolymerization is carried out as follows (it should be noted that the indicated procedure can, mutatis mutandis, be used for other viscous compounds):

The wax used is prepared in a prepolymerization reactor. Alternatively, it is prepared in a separate reactor and then afterwards fed into the prepolymerization reactor. During wax preparation due care is taken to produce a wax with so high viscosity that no settling takes place after prepolymerization; the process aims at getting the catalyst evenly distributed throughout the wax, and the catalyst should remain well distributed during storage. Too high a viscosity renders the even distribution of the catalyst more difficult during reaction. Typically the viscosity of the wax is kept in the above-mentioned range from about 4,000 to about 10,000 cP.

After preparation, the wax is cooled to about 10° to 40° C., typically to about 20° to 30° C. before the procatalyst composition is added. The procatalyst composition can be introduced into the wax together with an external donor and with a cocatalyst. An inert solvent, such as pentane, is preferably used as a medium during the addition of the components. A procatalyst composition comprising the cocatalyst, the electron donor and procatalyst composition is then formed in said inert solvent, for instance in pentane, and the procatalyst suspension is introduced under mixing into the wax which contains the cocatalyst. The procatalyst composition can, however, also be added into the wax separately from the donor and the cocatalyst without being mixed with any medium. The procatalyst is introduced into the wax below the surface of the wax and the wax-catalyst-composition is mixed after the introduction for some time (for instance for 1 to 120 min.) in order evenly to distribute the catalyst composition within the wax. Preferably the procatalyst composition is fed into a mixed zone of the wax. If desired, a portion of the donor and the cocatalyst can also be separately or jointly mixed into the wax before the catalyst and the rest of donor and the cocatalyst are added. As far as the invention is concerned, it is essential that the catalyst be fed into the wax or similar viscous medium, because otherwise inhomogeneous lumps might easily be formed on the surface of the medium during prepolymerization. Mixing and stirring is also important as regards the production of a homogeneous product.

A predetermined amount of a monomer is introduced into the mixed combination of the medium and the catalyst. Typically about 0.01 to 50 g, preferably about 0.1 to 10 g, of the monomer are added for each gram of the catalyst. The monomer is also fed below the surface of the wax and the agitation is continued until all the monomer substantially has been consumed. During the introduction of the gaseous monomer an increased monomer pressure is preferably maintained. The reaction can also be carried out in an inert atmosphere, a part of the increased pressure being produced with the inert gas. The temperature is maintained as evenly as possible during prepolymerization.

After the reaction the prepolymerized catalyst composition can be removed from the reaction vessel and used for polymerization. It has been found to have an excellent shelf life.

Summarizing the above-described features, the essential steps of the particularly preferred steps process are:
preparing a wax having a viscosity in the range of about 4,000 to about 10,000 cP in a reaction vessel,
maintaining the temperature of the wax at about 10° to 40° C.,
mixing a cocatalyst for the procatalyst composition and an electron donor with said wax to produce a cocatalyst-containing wax composition,
adding the procatalyst composition and the monomer used for prepolymerization of the procatalyst composition to the cocatalyst-containing vax, and
prepolymerizing the procatalyst composition until the monomer has been essentially consumed.

The catalyst composition according to the invention can be used for polymerization of α-olefins, such as ethylene, propene, butene, in particular ethylene or propene or mixtures thereof in manners known per se.

The invention provides considerable advantages. Thus, when the process according to the invention is implemented, the catalyst does not have to be dried before being fed into the medium and, as a result, a high catalyst activity is maintained. Furthermore, the catalyst does not need to be removed from the reactor, transferred into product containers and weighed separately before being introduced into the prepolymerization reactor. This means that several process and work steps become completely superfluous. The amount of waste is also diminished, because the prepolymerization medium does not have to be removed.

Surprisingly it has been found that the properties of the prepolymerized catalyst are not impaired by carrying out the prepolymerization in a viscous medium, and neither are the properties of the polyolefin prepared in the presence of a catalyst according to the invention. In both cases, the results obtained are fully comparable with the properties of products prepared by conventional techniques. The viscous substance has not been found to impair the properties of a product prepared by continuous bulk or slurry polymerization in equipment on pilot plant scale.

The are no up-scaling problems when moving from laboratory scale to pilot plant or industrial scale.

Next, the invention will be described in more detail with the help of a couple of working examples. The examples describe prepolymerization of catalyst compositions in a polyolefin wax and the use of a catalyst composition thus produced for preparing polyolefins, which represents a particularly preferred embodiment of the invention. It is clear to a person skilled in the art that the concept of the invention can also be implemented by suitably altering the specific details of the working examples with the aid of other kinds of waxes and similar viscous substances and other kinds of catalyst compositions, as mentioned above.

The activity of the prepared catalysts was determined by bulk polymerization of propene according to the following standard procedure:

Test polymerization:

The monomer (propylene) is purified before polymerization with aluminum oxide and with three purification catalysts. The purification catalyst used comprised a reduced BASF R 3-11 copper catalyst and 3 Å and 10 Å molecular sieves, respectively.

The polymerization was carried out in a 2 dm$^3$ laboratory autoclave equipped with a stirrer. 900 ml of heptane was first fed into the reactor as polymerization diluent. The heptane is purified with the same kind of purification catalysts as the monomer and it is kept in an autoclave under nitrogen pressure.

In a separate vessel, 30 ml of heptane, about 680 µl triethylaluminum (TEA) and about 50 µl of cyclohexyl methyldimethoxysilane (CHMMS) are then taken, and these substances are reacted with each other for about 5 min with intermittent stirring. Then 15 ml of TEA-donor-heptane solution is taken from the vessel and added upon the catalyst on a septume flask which, with the suspension formed, is agitated. The rest of the TEA-donor-heptane solution is fed into the reactor. The catalyst suspension is carefully introduced into the reactor and polymerization is then initiated by first feeding hydrogen into the reactor and then propylene at the same time as the temperature is increased. The pressure is allowed to raise to up to 7 bar and the temperature to 70° C. within 15 minutes. The rotational speed of the stirrer should be increased to about 600 l/min. The polymerization is continued for 4 h.

After the reaction the polymer is separated from the liquid phase by filtering.

EXAMPLE 1

Prepolymerization of a $MgCl_2$ based catalyst with propylene on laboratory scale A PP catalyst of Ziegler-Natta type which had been prepared according to Finnish Patent No. 86866 was prepolymerized in a 2.0 $dm^3$ reactor. A mixture containing 15 wt-% of atactic polypropylene (APP) and PAO oil (Neste Oy Nesbase 2006 FG) was used as reaction medium. The mixture was first prepared in a prepolymerization reactor. The temperature of the mixture was decreased to +25° C., the viscosity being 5700 cP.

Reagents used:

Catalyst 20 g/l (titanium content 2.7%)

Aluminum alkyl: TEA Al/Ti=5

Donor: CHMMS, Al/Don=10

Catalyst diluent: pentane 5 ml/g cat

⅓ of the donor and the cocatalyst were reacted for 5 min. and fed into the reactor. The rest of the donor and the cocatalyst was mixed in pentane with the catalyst and they were allowed to stay in contact for 10 min. The catalyst complex was fed into the reactor with a bottom pipe under the surface of the wax and it was agitated with an anchor agitator at a rotational speed of 300 rpm.

Agitation was continued for 15 min, and then the rotational speed was raised to 600 rpm and propylene feed (5 g/g cat) was commenced at a partitial pressure of 4.0 bar. The temperature was maintained at exactly 30° C. Prepolymerization was continued for 40 min until all the premonomer had reacted.

The product was removed from the reactor via a valve and via a 2 mm pipe fitted to the bottom of the reactor vessel and collected into sample bottles. The viscosity of the catalyst wax was somewhat decreased (500 cP) during prepolymerization, but not significantly as far as settling was concerned. A 1.0 liter glass sample vessel filled with the product was monitored for half a year and the product was found to remain non-sedimented and also otherwise in unchanged condition.

Test polymerization results

Using the prepolymerized catalyst wax a test polymerization was carried out by using the above-described standard method one (1) day and five (5) months after the prepolymerization. The purpose of the prolonged test period was to ascertain whether the isotacticity of the polymer decreases upon extended storage. The polymerization product comprised regularly shaped spherical particles of uniform size, which shows that prepolymerization had been homogeneous.

TABLE 1

Slurry-polymerization of propylene for 4.0 h at 70° C.

|  | 1 day after prepolymerization | 5 months after prepolymerization |
| --- | --- | --- |
| Activity | 15.3 kg/g cat | 15.8 kg/g cat |
| Isotacticity | 97.9% | 97.3% |
| Isotact.index | 96.8% | 96.1% |
| Melt index | 4.7 (2.16 kg) | 3.4 (2.16 kg) |
| Fines | 4.2% (d < 1.00 mm) | 4.0% (d < 1.00 mm) |
| Bulk density | 0.46 g/cm³ | 0.46 g/cm³ |

EXAMPLE 2

Prepolymerization of a $MgCl_2$ based catalyst with 4-methyl-1-pentene on laboratory scale The process described in Example 1 was followed using the following starting compounds:

Polyethylene wax (PAO 6 cSt+4.0 p-% PE-wax) viscosity. 6500 cP

Aluminum alkyl: TIBA, Al/Ti=5

Donor: MTBE (tert-methyl butyl ether) Al/Don=10

4M1P (5 g/g cat), which was gradually fed into the reactor in liquid form

All prepolymer was consumed in the reaction so it did not cause any change of viscosity.

Test polymerization results

The prepolymerized catalyst wax was test polymerized according to the standard method. The polymer particles were regularly spherical and of uniform size.

TABLE 2

Slurry-polymerization of propylene for 4.0 h at 70° C.

|  | 1 day after prepolymerization | 5 months after prepolymerization |
| --- | --- | --- |
| Activity | 14.3 kg/g cat | 14.1 kg/g cat |
| Isotacticity | 98.2% | 97.9% |
| Isotact.index | 96.8% | 96.5% |
| Melt index | 5.7 (2,16 kg) | 5.4 (2.16 kg) |
| Fines | 5.2% (d < 1,00 mm) | 5.6% (d < 1.00 mm) |
| Bulk density | 0.42 g/cm³ | 0.46 g/cm³ |

EXAMPLE 3

Prepolymerization of a $MgCl_2$ based catalyst with propylene on pilot plant scale A PP catalyst of Ziegler-Natta type was prepolymerized in a 10 $dm^3$ pilot plant reactor. A polyethylene wax was used as medium, the wax containing 4.0 wt-% of polyethylene in PAO oil. The wax was prepared in the prepolymerization reactor as described above and its temperature was lowered to 20° C., a viscosity of 7,000 cP being obtained.

Reagents used:

Catalyst amount: 17.3 g/l (titanium content 2.7%)

Aluminum alkyl: TEA. Al/Ti=5

Donor: CHMMS. Al/Don=10

The cocatalyst and the donor were separately fed into the reactor so that they were in contact for 15 min under agitation. The dry catalyst was fed into the reactor (with a bottom pipe into the wax) and the mixture was mixed for 15 min before premonomer feed. Propylene was slowly fed (5 g/g cat) into the reactor such that its partial pressure was 3.0 bar (+nitrogen 1.0 bar). The propylene feed into the reactor was continued for 105 min, the total prepolymerization time being 120 min. During the first hour, the temperature was maintained in the range of 25° to 30° C. During the second hour the temperature was kept at 30° to 35° C.

When the catalyst is dried from liquid medium, lumps are formed. None of these were found during wax prepolymerization.

The wax prepolymerized catalyst was tested and later run on PILOT scale in a LOOP reactor.

| Test polymerization results | |
|---|---|
| Activity | 13.0 kg/g cat |
| Isotacticity | 98.3% |
| Isotact.index | 97.1% |
| Melt index | 4.3 (2.16 kg) |
| Fines | 3.6% (d < 1.00 mm) |
| Bulk density | 0.45 g/cm³ |

EXAMPLE 4

Prepolymerization of a MgCl$_2$ based catalyst with propylene on pilot plant scale The test was carried out as Example 3, but prepolymerization was continued with vinyl cyclohexane (3 g VCH/g cat). The prepolymerization time with VCH was 6.0 hours, the temperature being 38° C. at low mixing speed.

| Test polymerization results | |
|---|---|
| Activity | 13.4 kg/g cat |
| Isotacticity | 98.0% |
| Isotact.index | 96.9% |
| Melt index | 4.2 (2.16 kg) |
| Fines | 4.0% (d < 1.00 mm) |
| Bulk density | 0.46 g/cm³ |

EXAMPLE 5

Prepolymerization of a MgCl$_2$ based catalyst with propylene and vinyl cyclohexane on pilot plant scale The method described in Example 3 was repeated with the difference that the amount of propylene was 3 g/g cat and
1,8-Cineole (Al/Don=10) was used as donor, Test polymerization results:

| Activity | 14.4 kg/g cat |
|---|---|
| Isotacticity | 97.8% |
| Isotact.index | 96.9% |
| Melt index | 4.5 (2.16 kg) |
| Fines | 3.2% (d < 1.00 mm) |
| Bulk density | 0.45 g/cm³ |

What is claimed is:

1. A prepolymerized catalyst composition, comprising a viscous substance having a viscosity of from 1,000 to 15,000 cP and dispersed therein a prepolymerized catalyst obtained by prepolymerizing a procatalyst composition, comprising a transition metal deposited on a support, with a prepolymerization monomer in the presence of said viscous substance.

2. The prepolymerized catalyst composition according to claim 1, further comprising a cocatalyst, wherein said prepolymerization was carried out in the presence of said cocatalyst.

3. The prepolymerized catalyst composition according to claim 2, further comprising an election donor, wherein said electron donor was present during said prepolymerization.

4. The catalyst composition according to claim 1, wherein said viscous substance comprises a wax.

5. The catalyst composition according to claim 4, wherein said wax comprises a polyolefin wax.

6. The catalyst composition according to claim 5, wherein said polyolefin wax comprises a polyethylene wax, having a viscosity in the range of about 1,000 to about 15,000 cP.

7. The catalyst composition according to claim 6, wherein said viscosity of said polyethylene wax is in the range of about 4,000 to about 10,000 cP.

8. The catalyst composition according to claim 5, wherein said wax comprises an atactic polypropylene wax having a viscosity in the range of about 1,000 to about 15,000 cP.

9. The catalyst composition according to claim 8, wherein the viscosity of said atactic polypropylene wax is in the range of about 4,000 to about 10,000 cP.

10. The catalyst composition according to claim 5, wherein said polyolefin wax comprises liquid poly-alpha-olefin mixed with 1 to 25% polyethylene.

11. The catalyst composition according to claim 5, wherein said polyolefin wax comprises a liquid poly-alpha-olefin mixed with 1 to 25% of atactic polypropylene.

12. The catalyst composition according to claim 1, wherein said prepolymerization monomer is selected from the group consisting of ethylene, propene, butene, 4-methyl-1-pentene, vinylcyclohexane, and mixtures thereof.

13. The catalyst composition according to claim 1, wherein said procatalyst composition was prepolymerized with a plurality of prepolymerization monomers.

14. The catalyst composition according to claim 1, wherein said viscous substance is a polyolefin wax, wherein said prepolymerization monomer is selected from the group consisting of ethylene, propene, butene, 4-methyl-1-pentene, vinylcyclohexane and mixtures thereof.

15. The catalyst composition according to claim 14, wherein the transition metal is selected from the group consisting of titanium, vanadium, zirconium, chromium, molybdenum, cobalt, nickel, tungsten, and rare earth metals.

16. The catalyst composition according to claim 1, wherein the support is selected from the group consisting of a polymer, a metal oxide, a metal halide, a metal hydroxide, a metal hydroxy halide, and combinations thereof.

17. The catalyst composition according to claim 16, wherein said support is a magnesium halide.

18. The catalyst composition of claim 1, wherein said viscosity of said viscous substance is in the range from about 4,000 to about 10,000 cP.

19. The catalyst composition of claim 1, wherein said viscous substance comprises a polyolefin wax or a poly-alpha-olefin oil.

20. The catalyst composition of claim 18, wherein said viscous substance comprises a polyolefin dissolved in a poly-alpha-olefin oil or mixed therewith.

21. The catalyst composition of claim 1, wherein said prepolymerized catalyst does not settle out of said viscous substance during transport or storage.

* * * * *